United States Patent [19]

Evans

[11] Patent Number: 4,712,585

[45] Date of Patent: Dec. 15, 1987

[54] ORIFICE PLATE HOLDER

[75] Inventor: Richard B. Evans, Tulsa, Okla.

[73] Assignee: Red Man Pipe and Supply Company, Tulsa, Okla.

[21] Appl. No.: 917,665

[22] Filed: Oct. 10, 1986

[51] Int. Cl.⁴ .................................... F16L 55/10
[52] U.S. Cl. ................... 138/44; 138/94.3; 277/180
[58] Field of Search ............ 138/44, 45, 40, 94.3; 277/180; 73/861.61; 29/445

[56] References Cited

U.S. PATENT DOCUMENTS

| | | | |
|---|---|---|---|
| 2,196,953 | 4/1940 | Bohmer, Jr. et al. | 277/180 |
| 2,339,970 | 1/1944 | Young | 138/44 |
| 2,520,089 | 8/1950 | Lippincott | 138/40 |
| 2,664,918 | 1/1954 | Hamer | 138/94.3 |
| 3,462,161 | 8/1969 | Daubenberger et al. | 277/180 |
| 3,715,870 | 2/1973 | Guzick | 138/44 |
| 4,370,893 | 2/1983 | Combes | 73/861.61 |
| 4,422,339 | 12/1983 | Gall et al. | 73/861.61 |
| 4,431,197 | 2/1984 | Kirkwood | 277/180 |
| 4,557,296 | 10/1985 | Byrne | 138/44 |

FOREIGN PATENT DOCUMENTS

| | | | |
|---|---|---|---|
| 565642 | 4/1931 | Fed. Rep. of Germany | 277/180 |
| 1285810 | 12/1968 | Fed. Rep. of Germany | 277/180 |

Primary Examiner—James E. Bryant, III
Assistant Examiner—Leo J. Peters
Attorney, Agent, or Firm—Head & Johnson

[57] ABSTRACT

An orifice plate holder for removeable insertion between juxtaposed flanges, the holder being formed of a plate body portion of rigid material having an opening therethrough, first and second elastomeric washer members having an outer diameter greater than the plate body portion opening and sealed to the opposed sides of the plate body portion, one of the washers being sealed only approximately one-half of its circumference so that the unsealed portion is resiliently deflectable away from the body portion, and an orifice plate insert of rigid material and of outer diameter less than that of the opening through the plate body portion, the orifice plate insert being insertable between the elastomeric washer members so that the assembly may be removeably positioned between adjacent flanges and tightened in position, the orifice plate insert being thereby easily replaceable as it wears or when it is desired to change to a different size orifice.

6 Claims, 3 Drawing Figures

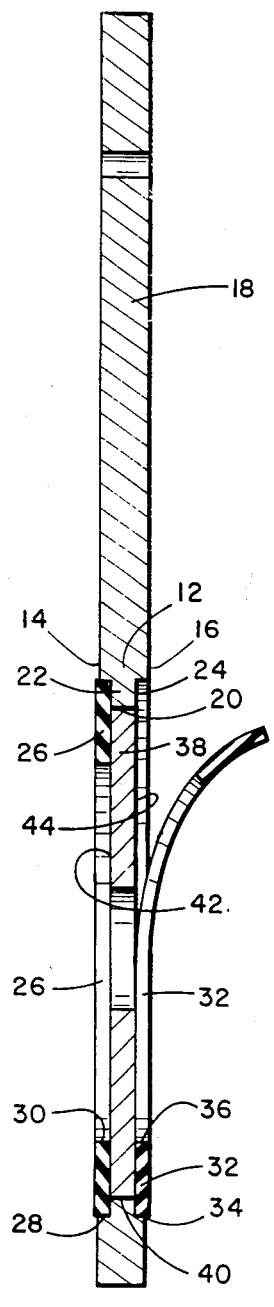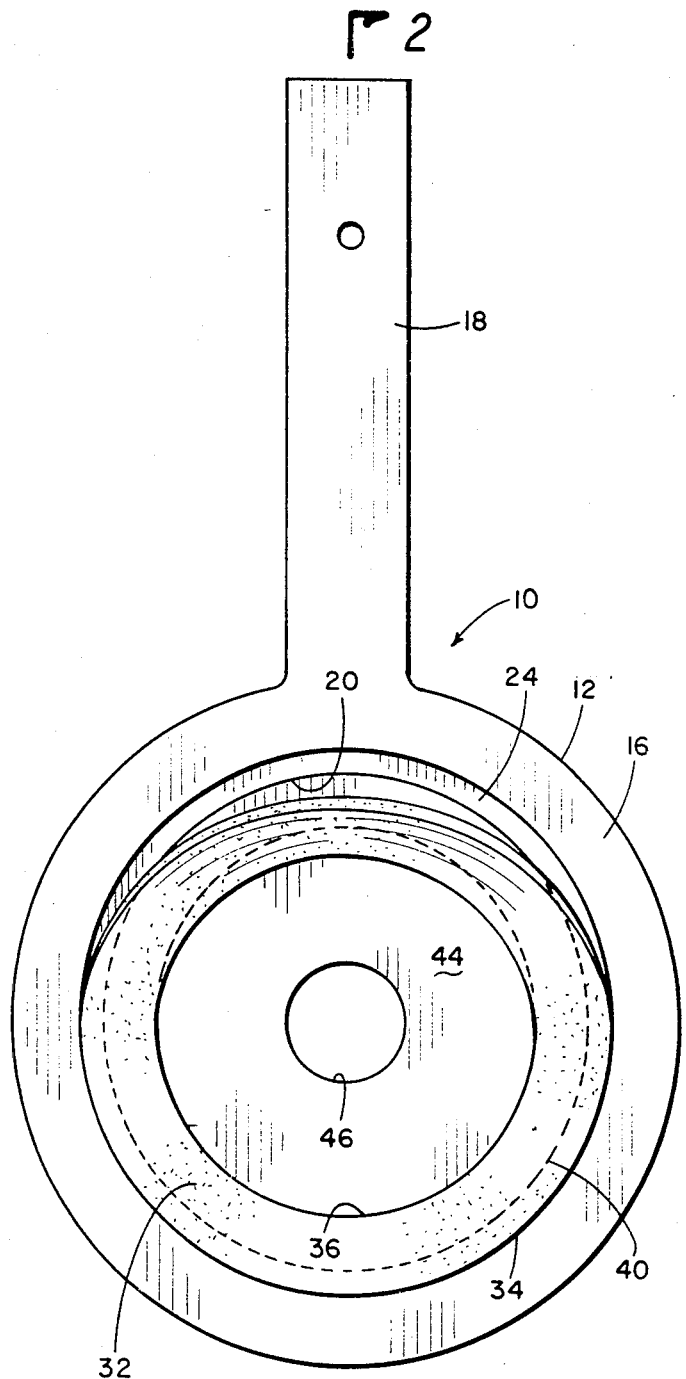
Fig. 2
Fig. 1

ORIFICE PLATE HOLDER

SUMMARY OF THE INVENTION

A common means for measuring gas flow volumes is by the use of an orifice. By inserting an orifice in a gas stream and detecting the up and downstream pressures, and the temperature of the gas, the volume of flow can be accurately determined.

Orifice plates are customarily used between two juxtaposed flanges. Bolts hold the flanges together. When the bolts are removed the orifice plate can be removed and the new orifice plate inserted. Orifice plates have a limited life, particularly in high volume applications since gas flowing through the orifice soon wears it away and any small change in the configuration of the orifice can destroy the accuracy of the flow measurement. In addition, as conditions change, it is frequently necessary to remove orifice plates and insert ones having a different orifice size. This can occur for instance, when the flow through a line decreases substantially. To obtain greater accuracy, a smaller orifice is required and the reverse is the case when the average flow rate increases. For all of these reasons it is customary in the industry to provide with orifice meters a flange arrangement in which the orifice plate can be easily removed and replaced. For prior art relating to orifice plates, reference may be had to the following U.S. Patents which also provide additional background information relating to the environment in which the present invention is employed: U.S. Pat. Nos. 2,520,089; 2,196,953; 4,538,470; and 4,399,708.

While as above indicated, the use of replaceable orifice plates is well known, there are several problems in connection with orifice plates. One is that the typical orifice plate is formed of metal and is a substantially large plate, even though the orifice opening may be relatively small. This causes the plates to be relatively expensive. In addition, it is important that the orifice plates be completely sealed on both opposed planar surfaces. Providing good gasket arrangements for orifice plates has been a problem in the past. The present invention attacks both of these problems and provides a orifice forming assembly which utilizes, as the active portion thereof, an orifice plate insert of substantially smaller diameter than that of the standard orifice plate, and therefore of substantially less expense and, in addition, in an arrangement wherein elastomeric seals are employed with the assembly as it is inserted into or removed from between juxtaposed flanges so that the integrity of seals can at all times be assured.

The orifice forming apparatus is formed of a plate body portion of rigid material, either metal or plastic. The body portion has opposed planar surfaces and a relatively large diameter opening through it.

A first elastomeric washer member is affixed to one side of the plate body portion. The washer member has an outer diameter greater than the opening through the plate body portion and an inner diameter which is less than the plate body portion opening. The first elastomeric seal is secured to one of the body portion planar surfaces such as by the use of adhesive or other type of bonding agent.

A second elastomeric washer member is secured to the other planar surface of the plate body portion, the elastomeric members preferably being identical in size, shape and thickness. The second elastomeric member, however, is bonded to the second planar surface of the body portion only around approximately one-half or less of its circumference leaving one-half or more unbonded. The unbonded half is free to flex outwardly and inwardly relative to the plate body portion.

An orifice plate insert is formed of rigid material, preferably metal, and is insertable within the opening in the plate body portion. It is inserted by flexing outwardly the unbonded portion of the second elastomeric washer and positioning the orifice plate insert in the opening in the plate body portion between the two elastomeric members. When in such position, the assembly can be then inserted between two juxtoposed flanges in the same way that a typical orifice plate is inserted. In addition, when it is necessary to remove the assembly, it is removed from between juxtaposed flanges in the same way as the typical orifice plate in present use.

The orifice plate assembly thus accomplishes, the two objectives initially mentioned. The orifice plate insert is of substantially reduced diameter compared to a full orifice plate and therefore is substantially less expensive to manufacture. Second, the elastomeric washer portions are removed with the assembly so that they can be easily inspected and replaced if necessary. In this way, seal of the orifice plate assembly is insured when it is inserted between juxtaposed flanges and the flanges tighten against the orifice plate assembly.

A better understanding of the invention will be had by reference to the following description and claims, taken in conjunction with the attached drawings.

DESCRIPTION OF THE DRAWING

FIG. 1 is a front elevational view of an orifice forming apparatus according to this invention.

FIG. 2 is a cross-sectional view taken along the line 2—2 of FIG. 1.

DESCRIPTION OF THE PREFERRED EMBODIMENTS

Figure 3:
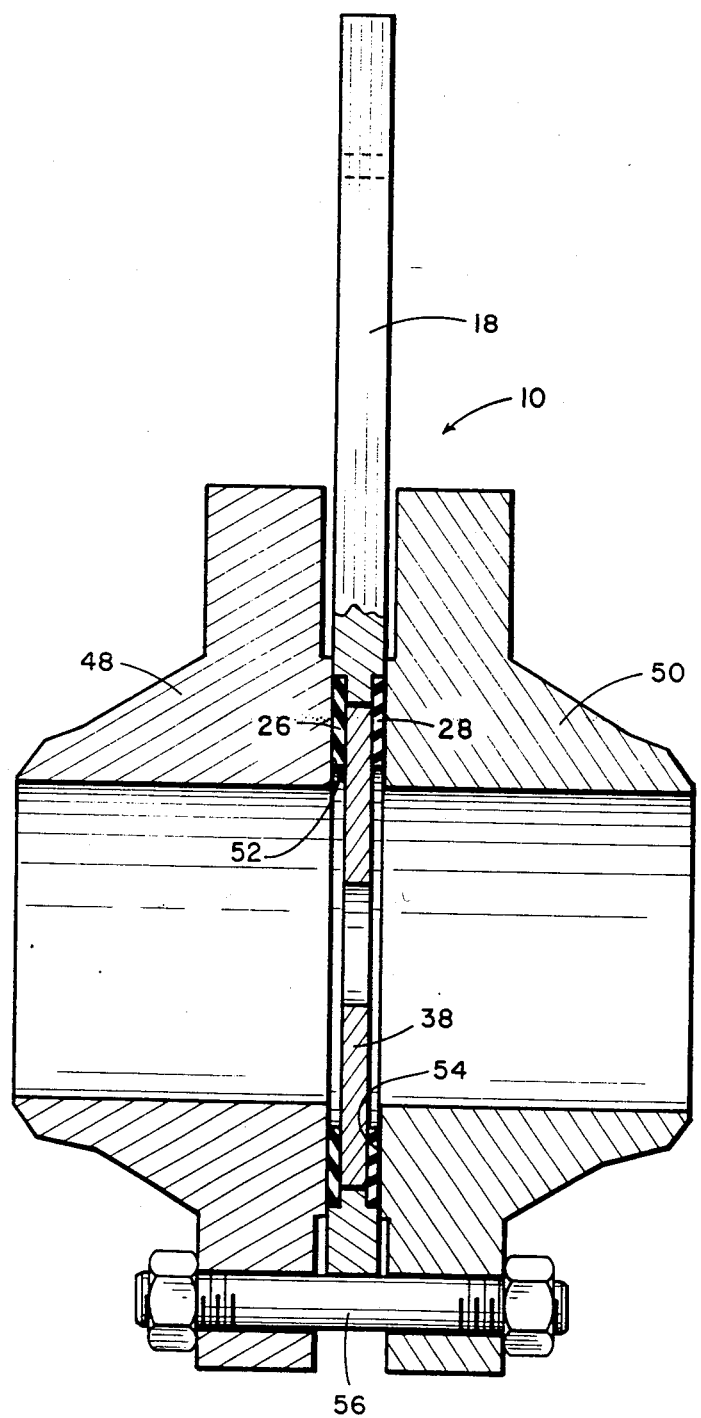
FIG. 3 is a cross-sectional view of the orifice plate of FIGS. 1 and 2 as inserted in the position between two juxtaposed flanges as would occur when the orifice plate assembly is in use to measure the volume of gas flow.

Referring to the drawings, the orifice forming assembly of this invention is generally indicated by the numeral 10 and includes a plate body portion 12 made of rigid material such as metal or plastic. The plate body portion 12 has a first planar surface 14 and a second planar surface 16, the spacing between the surfaces 14 and 16 representing the thickness of the plate body portion. In the embodiment shown the plate body portion 12 includes an integral handle 18 which facilitates placement of the orifice forming assembly 10 between juxtaposed flanges, or removing it therefrom.

Formed in the plate body portion 10 is a relatively large diameter opening 20. The plate body portion is further defined by a first circumferential recess 22 formed concentrically around opening 20 in the first planar surface 14 and, in like manner, a second circumferential recess 24 formed concentrically around the opening 20 is planar surface 16.

Secured to the plate body portion 12 within recess 22 is a first elastomeric washer member 26 having an outside diameter 28 which is greater than the diameter of opening 20, and an inner diameter 30 which is less than the body portion opening 20.

In like manner, a second elastomeric washer member 32 is affixed to the plate body portion 10 in recess 24, but is bonded to it only around approximately fifty percent (50%) of the circumference so that the second elastomeric washer member unbonded portion may be flexed outwardly as shown in FIGS. 1 and 2. The second elastomeric washer member has an outer diameter 34 and inner diameter 36 preferably of the same dimensions as the first elastomeric washer member 26. The only difference in the elastomeric washer members 26 and 32 is that the second washer member 32 is bonded only around approximately one-half of its periphery.

The thickness of the elastomeric washer members 26 and 32 is preferably slightly greater than the depth of recesses 22 and 24 so that, in the free state as shown in FIGS. 1 and 2, the outer surfaces of the elastomeric washer members extend beyond the planar surfaces 14 and 16 of the plate body portion.

The final element of the assembly is an orifice plate insert 38 which has an outer diameter 40 slightly less than the diameter of the plate body portion opening 20. The orifice plate has opposed planar surfaces 42 and 44, the thickness therebetween being preferably substantially equal to the thickness of the plate body portion between the recesses 22 and 24. The diameter 40 of the orifice plate insert is such that the inert snuggly but easily fits within the opening 20. The orifice plate insert has an orifice opening 46 through which gas flows. The dimension of orifice opening 46 is critical and varies according to the specific parameters of the orifice flow meter with which the orifice plate assembly is used.

FIG. 3 shows the orifice plate assembly in position between juxtaposed flanges 48 and 50. The flanges have planar end faces 52 and 54, and the flanges 48 and 50 are held together by a series of bolts 56 only one of which is shown. Generally, bolts 56 are positioned around substantially the entire periphery of the flanges with the orifice forming assembly handle 18 extending between adjacent bolts. The specific shape of flanges 48 and 50 is not a part of the invention and may vary considerably, but in each instance, regardless of the shape of the flanges, planar surfaces 52 and 54 are presented which receive a orifice plate therebetween. In the present invention a typical orifice plate is replaced by the assembly 10. When the flanges 48 and 50 are secured to each other the elastomeric washer members 26 and 28 are compressed forming a tight seal around the orifice plate insert 38, thus insuring a leak-proof arrangement.

When it is necessary to remove the orifice plate assembly, for inspection or replacement, the bolts 56 are loosened or removed as required. By use of handle 18 the entire assembly is easily slipped from between the juxtaposed flanges. If a new orifice opening 46 is required, that is, either because it is worn or because it is desirable to use a different orifice size, the orifice plate insert 38 is quickly removed from between the elastomeric washer members 26 and 32 by deflecting outwardly the unbonded portion of washer member 32. A new orifice plate insert 38 can then be positioned in the opening 20 within the plate body portion 12 in the assembly and the assembly is ready to be repositioned between flanges 48 and 50.

While the invention has been described with a certain degree of particularly it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An orifice forming assembly for insertion between juxtaposed flanges, comprising:

a plate body portion of rigid material having first and second opposed planar surfaces and having an opening therethrough;

a first elastomeric washer member having an outer diameter greater than said plate body portion opening and an inner diameter less than said plate body portion opening, the first elastomeric washer member being secured to said first body portion planar surface coaxially with said body portion opening;

a second elastomeric washer member contacting said second body portion planar surface, said second elastomeric washer having an outer diameter greater than said plate body portion opening and an inner diameter less than said plate body portion opening, approximately one-half of the second elastomeric washer member contacting surface being secured to said second body portion planar surface coaxially with said body portion opening, the unsecured portion being resiliently deflectable away from said body portion second planar surface; and an orifice plate insert of rigid material having first and second opposed planar surfaces and of an outer diameter less than said opening through said plate body portion and larger than said elastomeric washer members inner diameters and having a central orifice hole therethrough, the orifice plate insert being removeably inserted into said opening in said plate body portion and between said elastomeric washer members, said plate body portion, said elastomeric washer members and said orifice plate being insertable and removeable as a unit between juxtaposed flanges.

2. An orifice forming apparatus according to claim 1 wherein said plate body portion has an integral handle portion.

3. An orifice forming apparatus according to claim 1 wherein said elastomeric washer members are secured to said plate body portion by adhesive.

4. An orifice forming apparatus according to claim 1 wherein said plate body portion has a circumferential recess in each of said planar surfaces concentric with said opening therethrough, the diameter of each said recess being larger than the outer diameter of said elastomeric washer member and said elastomeric washer members being received in said recesses.

5. An orifice forming apparatus according to claim 4 wherein said orifice plate insert is of thickness substantially equal to the thickness of said plate body portion between said circumferential recesses.

6. An orifice forming apparatus according to claim 4 wherein the depth of said circumferential recesses is less than the thickness of said elastomeric washer members.

* * * * *